United States Patent [19]

Takase et al.

[11] Patent Number: 5,105,358

[45] Date of Patent: Apr. 14, 1992

[54] ACTIVE SUSPENSION SYSTEM WITH ENHANCED SYSTEM START-UP ACTIVITY

[75] Inventors: Sadao Takase; Kazunobu Kawabata, both of Kanagawa, Japan

[73] Assignee: Nissan Motor Company, Limited, Yokohama, Japan

[21] Appl. No.: 513,272

[22] Filed: Apr. 20, 1990

[30] Foreign Application Priority Data

Apr. 20, 1989 [JP] Japan .................................. 1-100824

[51] Int. Cl.⁵ ............................................ B60G 17/00
[52] U.S. Cl. ............................... 364/424.05; 280/707; 280/840
[58] Field of Search .................... 364/424.05; 280/707, 280/840

[56] References Cited

U.S. PATENT DOCUMENTS

| | | | |
|---|---|---|---|
| 4,702,490 | 10/1987 | Yamaguchi et al. | 280/707 |
| 4,848,790 | 7/1989 | Fukunaga et al. | 280/707 |
| 4,865,347 | 9/1989 | Fukushima et al. | 280/707 |
| 4,865,348 | 9/1989 | Hano et al. | 280/707 |
| 4,888,696 | 12/1989 | Akatsu et al. | 364/424.05 |
| 4,903,983 | 2/1990 | Fukushima et al. | 280/707 |
| 4,905,152 | 2/1990 | Kawabata | 280/707 |
| 4,927,170 | 5/1990 | Wada | 280/707 |
| 4,930,082 | 5/1990 | Harara et al. | 280/707 |

Primary Examiner—Gary Chin
Attorney, Agent, or Firm—Foley & Lardner

[57] ABSTRACT

An actively controlled suspension system comprises a hydraulic cylinder disposed between a vehicle body and a suspension member rotatably supporting a vehicular wheel, the hydraulic cylinder defining therein a working chamber, a pressure source including a pump associated with an automotive internal combustion engine to be driven by the output of the engine, a pressure control valve having a first port connected to the working chamber, a second port connected to the pressure source via a supply line and a third port connected to the pressure source via a drain line, the pressure control valve being variable of valve position for selectively establishing and blocking fluid communication between the first port and the second port and between the first port and the third port for adjusting fluid pressure in the working chamber for controlling suspension characteristics, a vertical acceleration sensor for monitoring vertical acceleration exerted on the vehicular body to produce a vertical acceleration indicative signal, first circuit for arithmetically deriving a vertical stroke speed of the vehicular body on the basis of the vertical acceleration indicative signal, second circuit for detecting initiation of arithmetic operation of the first circuit for setting data for use in derivation of the vertical speed in a value for cancelling offset contained in the vertical acceleration indicative signal.

6 Claims, 6 Drawing Sheets

ACTIVE SUSPENSION SYSTEM WITH ENHANCED SYSTEM START-UP ACTIVITY

BACKGROUND OF THE INVENTION

1. Field of the Invention

The present invention relates generally to an active suspension system for an automotive vehicle. More specifically, the invention relative to derivation of vertical stroke speed as control parameter for active suspension control.

2. Description of the Background Art

U.S. Pat. No. 4,702,490, issued on Oct. 27, 1987 which has been assigned to the common owner to the present invention, discloses one of typical construction of an actively controlled suspension system, in which a hydraulic cylinder defining a working chamber is disposed between a vehicular body and a suspension member rotatably supporting a vehicular wheel. The working chamber of the hydraulic cylinder is communicated with a hydraulic circuit including a pressurized working fluid source. A pressure control valve, such as an proportioning valve assembly, is disposed in the hydraulic circuit, which is connected to an electric or electronic control circuit to be controlled the valve position. The pressure control valve is controlled the valve position by a suspension control signal produced in the control circuit for adjusting pressure in the working chamber and whereby controlling suspension characteristics.

On the other hand, European Patents 0 283 004, 0 285 153 and 0 284 053 discloses technologies for controlling the suspension systems constructed as set forth above, depending upon the vehicle driving condition for suppressing rolling and/or pitching of the vehicular body. Furthermore, Japanese Patent First Publication 62-289420, Japanese Patent First Publication 62-295714 disclose similar active suspension systems.

For example, Japanese Patent First Publication 62-289420 discloses suppression of vertical displacement of vehicular body by adjusting fluid pressure in a hydraulic cylinder to generate a force resisting against the vehicular body motion. For this, it becomes necessary to derive a vertical stroke or motion speed of the vehicular body. In the above-identified Publication, the vertical stroke speed is arithmetically derived on the basis of a vertical acceleration monitored by means of a vertical acceleration sensor. A vertical acceleration indicative signal produced by the vertical acceleration sensor is supplied to a low-pass filter which serves as an integrator for integrating the vertical acceleration and thus deriving the vertical stroke speed. The vertical acceleration indicative signal is also supplied to a band-pass filter for removing direct current component from the vertical acceleration indicative signal. Such filtering process is performed by digital filter for obtaining sufficiently high process speed.

In such prior proposed active suspension system, a drawback is encountered in derivation of the vertical stroke speed. Namely, the vertical acceleration indicative signal output from the vertical acceleration sensor may contain offset due to a temperature dependent drift. Such offset may serves to provide equivalent effect to supply stepwise input for the filter to cause swift variation of the vertical stroke speed upon starting-up of operation of the system. Such swift variation may cause activation of the active suspension system to initiate vibration suppressive operation despite of the fact that the vehicle body is maintained at stable state. This can lead vertical displacement of the vehicular body upon starting of system operation, i.e. turning ON of an ignition switch, to surprise the passengers. This clearly degrade the riding comfort of the vehicle.

SUMMARY OF THE INVENTION

Therefore, it is an object of the present invention to provide an active suspension system which is enhanced system starting-up characteristics for avoiding unexpected or unnecessary adjustment of the fluid pressure even when offset due to temperature dependent drift is contained in a vertical acceleration indicative signal.

According to one aspect of the invention, an actively controlled suspension system comprises:

a hydraulic cylinder disposed between a vehicle body and a suspension member rotatably supporting a vehicular wheel, the hydraulic cylinder defining therein a working chamber;

a pressure source means including a pump means associated with an automotive internal combustion engine to be driven by the output of the engine;

a pressure control valve means having a first port connected to the working chamber, a second port connected to the pressure source means via a supply line and a third port connected to the pressure source means via a drain line, the pressure control valve means being variable of valve position for selectively establishing and blocking fluid communication between the first port and the second port and between the first port and the third port for adjusting fluid pressure in the working chamber for controlling suspension characteristics; and a vertical acceleration sensor for monitoring vertical acceleration exerted on the vehicular body to produce a vertical acceleration indicative signal;

first means for arithmetically deriving a vertical stroke speed of the vehicular body on the basis of the vertical acceleration indicative signal;

second means for detecting initiation of arithmetic operation of the first means for setting data for use in derivation of the vertical speed in a value for canceling offset containing in the vertical acceleration indicative signal.

According to another aspect of the invention, an actively controlled suspension system comprises:

a hydraulic cylinder disposed between a vehicle body and a suspension member rotatably supporting a vehicular wheel, the hydraulic cylinder defining therein a working chamber;

a pressure source means including a pump means associated with an automotive internal combustion engine to be driven by the output of the engine;

a pressure control valve means having a first port connected to the working chamber, a second port connected to the pressure source means via a supply line and a third port connected to the pressure source means via a drain line, the pressure control valve means being variable of valve position for selectively establishing and blocking fluid communication between the first port and the second port and between the first port and the third port for adjusting fluid pressure in the working chamber for controlling suspension characteristics; and a vertical acceleration sensor for monitoring vertical acceleration exerted on the vehicular body to produce a vertical acceleration indicative signal;

first means for arithmetically deriving a vertical stroke speed of the vehicular body on the basis of instantaneous value and precedingly sampled value of the vertical acceleration indicative signal;

second means for detecting initiation of arithmetic operation of the first means for setting the precedingly sampled vertical acceleration indicative signal value for use in derivation of the vertical speed in a value for canceling offset containing in the vertical acceleration indicative signal.

BRIEF DESCRIPTION OF THE DRAWINGS

The present invention will be understood from the detailed description given herebelow and from the accompanying drawings of the preferred embodiments of the invention, which, however, should not be taken for limiting the invention to the specific embodiments, but are for explanation and understanding only.

In the drawings.

DESCRIPTION OF THE PREFERRED EMBODIMENT

Figure 1:
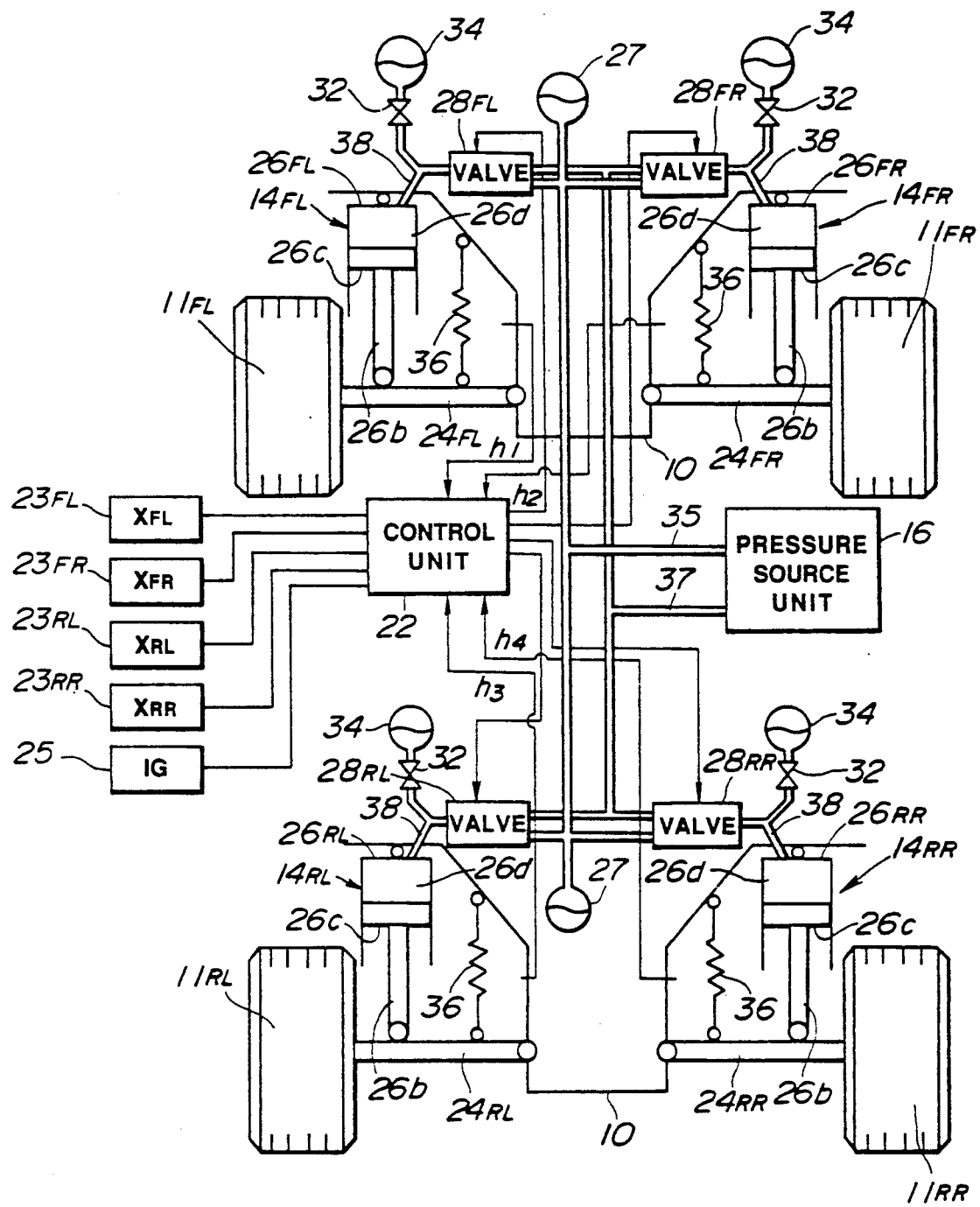
FIG. 1 is a diagrammatical illustration of the overall construction of the preferred embodiment of an active suspension system, according to the present invention, in which the preferred embodiment of a proportioning valve assembly is employed as a pressure control valve.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right, rear-left and rear-right wheels 11FL, 11FR, 11RL and 11RR. The suspension member will be hereafter represented by the reference numeral "24" as generally referred to. Similarly, the suspension mechanism as generally referred to will be hereafter represented by the reference numeral "14". Respective front-left, front-right, rear-left and rear-right suspension mechanisms 14FL, 14FR, 14RL and 14RR have hydraulic cylinders 26FL, 26FR, 26RL and 26RR which will be represented by the reference numeral "26" as generally referred to.

Each of the hydraulic cylinder 26 is disposed between the vehicular body 10 and the suspension member 24 to produce a damping force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d and a reference pressure chamber 26e. The working chamber 26d may be communicated with the reference pressure chamber 26e via an orifice formed through the piston for fluid communication therebetween in an substantially restricted amount. The piston 26c is connected to the associated one of suspension member 24 via a piston rod 26b. A suspension coil spring 36 employed in the shown type of the suspension system is not required a resilient force in a magnitude required in the ordinary suspension system and only required the resilient force necessary for maintaining the vehicular body about the suspension member.

The working chamber 26d of the hydraulic cylinder 26 is connected one of pressure control valves 28FL, 28FR, 28RL and 28RR via a pressure control line 38. The pressure control valve 28FL, 28FR, 28RL and 28RR will be hereafter represented by the reference numeral "28" as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Another pressure accumulator 18 is provided in the supply line 35 for accumulating the excessive pressure generated in the pressure source unit 16.

The pressure control valves 28 comprise, though it is not clearly shown in FIG. 1, electrically or electromagnetically operable actuators (reference is made to FIG. 2), such as a proportioning solenoids. The actuators are connected to a microprocessor based control unit 22. The control unit 22 is connected to vertical acceleration sensors 23FL, 23FR, 23RL and 23RR respectively designed for monitoring vertical accelerations portions of the vehicular body where the associated suspension systems 14FL, 14FR, 14RL and 14RR are provided. The control unit 22 is also connected to an ignition switch 25 which serves as a main power switch.

Figure 2:
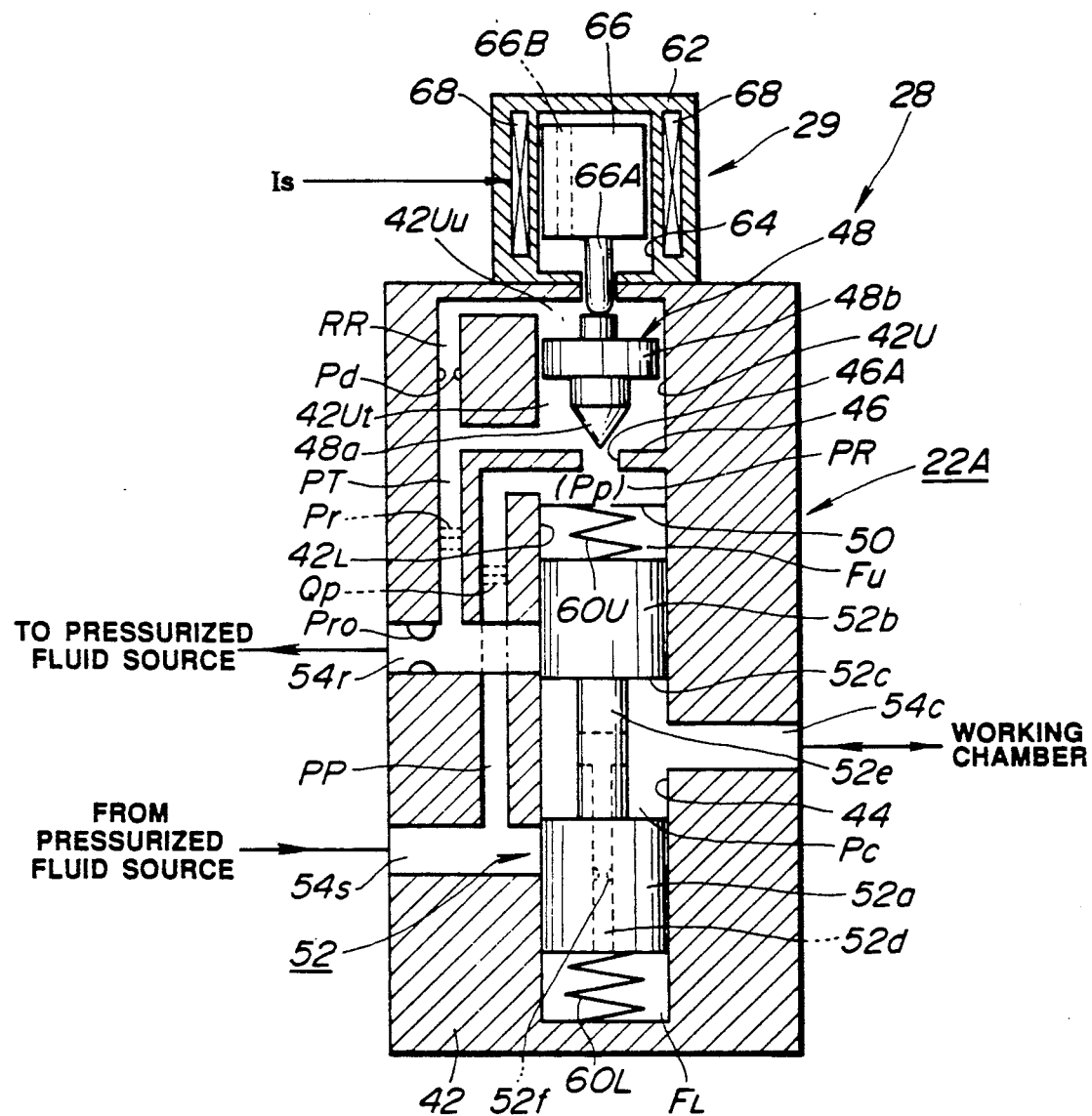
FIG. 2 is a sectional view of the preferred embodiment of the pressure control valve according to the present invention.

As shown in FIG. 2 in detail, the pressure control valve 28 comprises a proportioning valve assembly and is designed to be controlled by an electric current as a control signal supplied from the control unit 22 for varying valve position according to variation of the current value of the control signal. Generally, the pressure control valve 28 controls magnitude of introduction and draining of pressurized fluid into and from the working chamber 26d for adjusting the pressure in the working chamber. As will be appreciated, since the adjusted fluid pressure in the working fluid determines damping force to be created in response to relative displacement between the vehicle body 10 and the suspension member 24. Mode of the suspension mechanism is varied according to variation of the fluid pressure in the working chamber between a predetermined hardest mode to most soft mode.

In the construction of the pressure control valve shown in FIG. 2, the pressure control valve 28 includes a valve housing 42. The valve housing 42 defines a valve bore 44 which is separated in to a valve chamber 42L and a control chamber 42U by means of a partitioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment to each other across the communication path opening 46A. In parallel to a section of the partitioning wall 46 extending perpendicular to the axis of the valve chamber 42L and the control chamber 42U, a fixed orifice defining partitioning member 50 is provided. The partitioning member 50 defines a throttling orifice which is oriented substantially in alignment with the communication path opening 46A. The partitioning wall 46 and the partitioning member 50 are cooperative for defining a pilot chamber PR therebetween.

A valve spool 52 is thrustingly and slidingly disposed within the valve chamber 42L. The valve spool 52 defines an upper feedback chamber FU between the tip end thereof and the partitioning member 50. The valve spool 52 also defines a lower feedback chamber FL between the other tip end thereof and the bottom of the valve chamber 42L. Offset springs 60U and 60L are disposed within the upper and lower feedback chambers FU and FL, which offset springs exerts spring force to the valve spool 52 for resiliently restricting movement of the latter. Resilient force of the offset springs 60U and 60L are so set as to balance to place the valve spool 52 at a neutral position, when the fluid pressure in the upper and flow feedback chambers FU and FL balances to each other. The valve chamber 42L is communicated with a supply line 35 via an supply port 54s, a drain line 37 via a drain port 54r and a pressure control line 38 via a control port 54c, which supply port, drain port and control port are defined in the valve housing 42. The valve spool 52 at the aforementioned neutral position, blocks fluid communication of the pressure control chamber PC with any of the supply port 54s and the drain port 54r. As a result, as long as the valve spool 52 is maintained at the neutral position, overall fluid force in the hydraulic circuit downstream of the pressure control valve, which circuit includes the working chamber 26d of the hydraulic cylinder 26 is held constant.

The valve spool 52 is formed with lands 52a and 52b connected to each other via smaller diameter bar-like section 52e. The land 52a is oriented adjacent the lower feedback chamber FL so as to subject the tip end to the fluid pressure in the lower feedback chamber. Similarly, the land 52b is oriented adjacent the upper feedback chamber FU so as to subject the tip end to the fluid pressure in the upper feedback chamber. The bar-like section 52e between the lands 52a and 52b is cooperative with the peripheral wall of the valve chamber 42L in order to define therebetween a pressure control chamber PC. A fluid flow path 52d is formed through the valve spool 52. The fluid flow path 52d has one end communicated with the pressure control chamber PC and the other end communicated with the lower feedback chamber FL. A fixed flow restricting orifice 52f is formed in the fluid flow path 52d for restricting fluid flow therethrough.

A poppet valve member 48 is disposed within the control chamber 42U for thrusting movement therein. The poppet valve member 48 has a valve head 48a of an essentially conical configuration. The valve head 48a opposes to the communication path opening 46A of the partitioning wall 46. The poppet valve member 48 is operably associated with a proportioning solenoid assembly 29 as the actuator. The proportioning solenoid assembly 29 comprises a housing 62 rigidly secured on the valve housing 42 and defining an internal space to receive therein a plunger 66. The plunger 66 has a plunger rod 66A. The tip end of the plunger rod 66A is kept in contact with the tip end of the poppet valve member 48 remote from the valve head 48a. Therefore, the poppet valve member 48 is axially driven by means of the plunger 66 to control the path area in the communication path opening 46A according to the position of the tip end of the plunger rod 66A. Adjusting of the path area in the communication path opening 46A results in variation of fluid pressure to be introduced into the pilot chamber PR.

In order to control the position of the plunger 66 with the plunger rod 66A, a proportioning solenoid coil 68 is housed within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure to be exerted on the poppet valve and the plunger so that the position of the tip end of the plunger rod 66A can be determined solely depending upon the magnitude of energization of the proportioning solenoid coil 68.

As seen from FIG. 2, the poppet valve member 48 has a cylindrical larger diameter section 48b for separating the control chamber 42U into upper section and lower section 42Uu and 42Ul. The upper and lower sections 42Uu and 42Ul are communicated with the drain port 54r via a pilot return path PT. A multi-stage orifice Pr is provided in the pilot return path PT for restricting fluid flow therethrough. The multi-stage orifice Pr comprises a plurality of strips formed with through openings and is so designed that one of the orifice oriented at most upstream side is mainly effective for restricting fluid flow when fluid flowing therethrough is steady flow and that all of the orifices of respective strips are equally effective for restricting fluid flow when fluid flow therethrough is disturbed and not steady. Therefore, as will be appreciated herefrom, the multi-stage orifice Pr employed in the shown embodiment serves to provide greater fluid flow restriction against non-steady or disturbed fluid flow than that for the steady flow. As seen from FIG. 2, the multi-stage orifice Pr is provided upstream of the upper and lower sections 42Uu and 42Ul. On the other hand, a fixed throttling orifice Pd is provided at an orientation downstream of the lower section 42Ul and upstream of the upper section 42Uu. Similarly, the pilot chamber PR is communicated with the supply port 54s via a pilot path PP. A multi-stage orifice Qp which has similar construction and flow restricting function to that of the multi-stage orifice Pr is provided in the pilot path PP.

A fixed throttle orifice Pro is also provided in the drain port 54r for restricting fluid flow therethrough. The diameter of the fluid path at the orifice Pro is so selected as to create great flow restriction against pulsatile fluid flow cyclically varying the fluid pressure at a frequency approximately 1 Hz.

As can be seen from FIG. 2, the pressure control valve 28 is so arranged as to direct the axis of the valve bore 44 parallel to the longitudinal axis of the vehicle body. The longitudinal acceleration to be exerted on the vehicular body is much smaller than the lateral acceleration and vertical acceleration exerted on the vehicle body. Therefore, by arranging the pressure control valve 28 so that the poppet valve 48 and the valve spool 52 thrustingly move in longitudinal direction, influence of the externally applied acceleration can be minimized.

Figure 3:
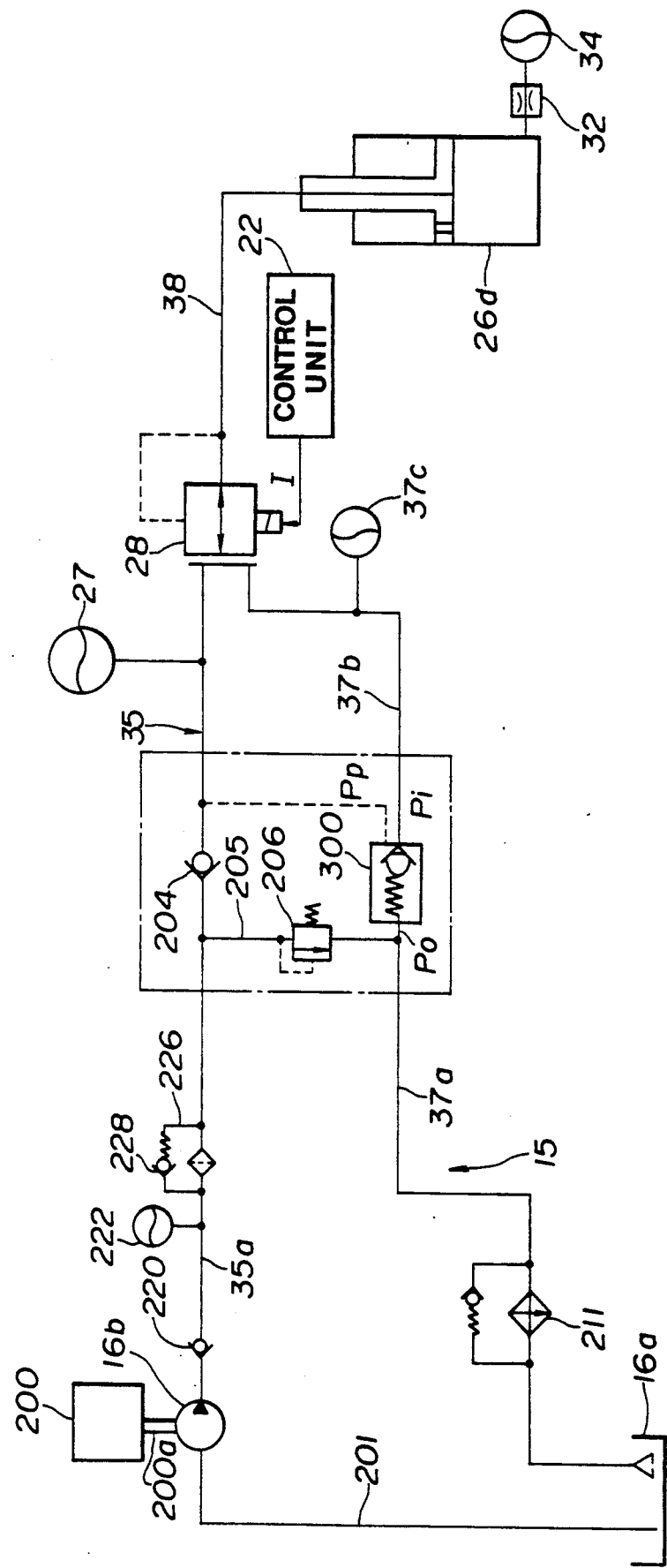
FIG. 3 is a circuit diagram of one example of hydraulic circuit which is applicable for the active suspension system according to the present invention.

FIG. 3 shows detailed circuit construction of one example of hydraulic circuit which is applicable for the shown embodiment of the active suspension system, according to the present invention. The hydraulic circuit includes a fluid pressure source circuit 15 which includes the pressure source unit 16. The pressure source unit 16 includes the pressure unit 16b which comprises a fluid pump, and is connected to a fluid reservoir 16a via a suction pipe 201. The fluid pump 16b is associated with an automotive engine 200 so as to be driven by the output torque of the latter output from an engine output shaft 200a. The outlet of the pressure unit 16b, through which the pressurized working fluid is discharged, is connected to the supply port 54s of the pressure control valve 28 via the supply line 35. An one-way check valve 220, a pressure accumulator 222 for absorbing pulsatile, a filter 224 are disposed in a portion 35a of the supply line 35. A by-pass passage 226 with an one-way check valve 228 is provided for by-passing the filter 224.

A pressure accumulators 27 are also connected to the supply line 35 to receive therefrom the pressurized fluid for accumulating the pressure. An one-way check valve 204 is disposed in the supply line 35 at the position upstream of the junction between the pressure accumulators 27 and the supply line 35.

A pressure relief line 205 is also connected to the supply line 35 at the position intermediate between the filter 224 and the one-way check valve 204, at one end. The other end of the pressure relief line 205 is connected to the drain line 37. A pressure relief valve 206 is disposed in the pressure relief line 205. The pressure relief valve 206 is responsive to the fluid pressure in the supply line 35 higher than a set pressure to drain the excessive pressure to the drain line for maintaining the pressure in the supply line 35 below the given first line pressure level.

On the other hand, an operational one-way check valve 300 is disposed between the sections 37a and 37b of the drain line 37. The operational one-way check valve 300 is also connected to the supply line 35 at downstream of the one-way check valve 204 to receive therefrom the pressure in the supply line as a pilot pressure, via a pilot line 208. The operational one-way check valve 300 is designed to be maintained at open position as long as pilot pressure introduced from the supply line 35 at the orientation downstream of the one-way check valve 204 is held higher than a predetermined pressure. At the open position, the operational one-way check valve maintains fluid communication between the inlet side and outlet side thereof so that the working fluid in the drain line 37 may flow therethrough to the reservoir tank 16a. On the other hand, the operational one-way check valve 300 is responsive to the working fluid pressure in the supply line downstream of the one-way check valve 204 serving as the pilot pressure dropping below the predetermined pressure level to be switched into shut-off position. At the shut-off position, the operational one-way check valve 300 blocks fluid communication between the drain port 54r of the pressure control valve 28 and the reservoir tank 16a. In the shown embodiment, the predetermined pressure is set at a pressure corresponding to the neutral pressure of the pressure control valve unit 28.

For the section 37b of the drain line 37, a pressure accumulator 37c is provided. The pressure accumulator 37c is arranged for absorbing back pressure to be generated by flow resistance in the drain line 37.

An oil cooler 211 is disposed in the drain line 37 for cooling the working fluid returning to the reservoir tank 16a.

Figure 5:
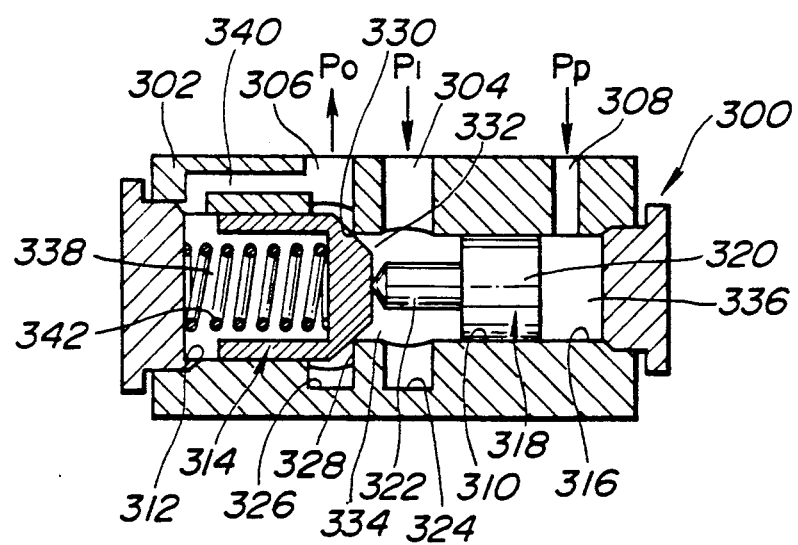
FIG. 5 is a sectional view of an operational one-way check valve employed in the preferred embodiment of the hydraulic circuit of the active suspension system of the invention.

FIG. 5 shows the detailed construction of the preferred embodiment of the operational one-way check valve 300 to be employed in the preferred embodiment of the active suspension system according to the present invention. As shown in FIG. 5, the operational one-way check valve 300 comprises a valve housing 302 formed with an inlet port 304, an outlet port 306 and a pilot port 308. The valve housing 302 defines a valve bore 310. The valve bore 310 comprises a larger diameter section 312, in which a poppet valve 314 is thrustingly disposed, and a smaller diameter section 316, in which a valve spool 318 is disposed. The pilot port 308 is communicated with the supply line 35 at the section 35a disposed between the one-way check valve 204 and the pressure control valve unit 28FL, 28FR, 28RL and 28RR, via the pilot line 300a. The pilot port 308 is, on the other hand, communicated with the smaller diameter section 316 to supply the line pressure of the supply line 35 at the orientation downstream of the one-way check valve 204 as the pilot pressure Pp. On the other hand, the inlet port 304 is communicated with the drain port 54r of the pressure control valve unit 28 via a section 37b of the drain line 37. The inlet port 304 communicates with the smaller diameter section 316 via an annular groove 324 formed on the inner periphery of the valve housing 302. The outlet port 306 is communicated with the fluid reservoir 16a via a section 37a of the drain line 37 and, in turn, communicated with the larger diameter section 312 via an annular groove 326 formed on the inner periphery of the valve housing 302. As seen from FIG. 5, the annular grooves 324 and 326 are oriented in side-by-side relationship with leaving a radially and inwardly projecting land 328. The land 328 has a shoulder 330.

The valve spool 318 and the poppet valve 314 are cooperated with each other to define therebetween a control chamber 334 which communicates with the inlet port 304 and the outlet port 306. On the other hand, the valve spool 318 also defines a pilot chamber 336 at a side remote from the control chamber 334. The poppet valve 314 defines a pressure setting chamber 338 at a side remote from the control chamber 334. The pressure setting chamber 338 is communicated with the outlet port 306 via a path 340. A set spring 342 is disposed within the pressure setting chamber 338 for normally exerting a spring force to the poppet valve 314. In the preferred embodiment, the set spring 342 is provided a set force which corresponds the neutral pressure $P_N$ of the pressure control valve unit 28.

The valve spool 318 has a valve body 320 and a valve stem 322 projecting from the valve body toward the poppet valve 314. The tip end of the valve stem 322 contacts with the mating surface of the poppet valve 314. The poppet valve 314 has an annular shoulder 332 mating with the shoulder of the land 330.

With the construction set forth above, the operational one-way check valve 300 operates as both of the pressure relief valve for relieving the excessive pressure in the drain line and one-way check valve. The relief pressure of the poppet valve 314 can be illustrated by the following balancing equation:

$$F_0 = P_{p0} \times A$$

where $F_0$ is the set pressure of the set spring 342;
A is an effective area of the spool; and
$P_{p0}$ is a relief pressure.

Here, assuming that the pressure Pi at the inlet port 304 is greater than or equal to the pilot pressure Pp at the pilot chamber 336, the valve spool 318 is shifted away from the poppet valve 314 so that the pilot pressure Pp in the pilot chamber 336 is not active on the valve position of the poppet valve. In such case, the poppet valve 314 operates purely as the pressure relief valve for relieving excessive pressure. At this time, the force balance as illustrated by:

$$Pi \times A = P_{p0} \times A$$

can be established. Therefore, as long as the fluid pressure at the inlet port 304 is higher than the relief pressure $P_{p0}$, the shoulder 332 of the poppet valve 314 is held away from the shoulder 330 of the land 328 so as to permit fluid flow through the outlet port 306 and the section 37a of the drain line 37 to the fluid reservoir 16a. On the other hand, when the pressure at the inlet port 304 is lower than or equal to the relief pressure $P_{p0}$, then, the spring force of the set spring 342 overcomes the fluid pressure to establish contact between the mating shoulders 332 and 330 to block fluid communication between the control chamber 334 and the outlet port 306.

On the other hand, when the pressure Pi at the inlet port 304 is lower than the pilot pressure $P_p$ in the pilot chamber 336, the valve spool 318 is shifted toward the poppet valve 314 to contact with the latter at the tip end of the valve stem 334. At this time, the force to depress the valve stem 334 onto the poppet valve 314 can be illustrated by $(P_p - Pi) \times A$. At this time, the pressure PI introduced into the control chamber 334 via the inlet port 304 is canceled as an internal pressure. Therefore, the pressure balance at the poppet valve 314 can be illustrated by:

$$F_0 + kx = P_p \times A$$

where
k is a spring coefficient of the set spring 342; and
x is a stroke of the poppet valve 314.

From the balancing equations give hereabove, the operational check valve 300 becomes open when the pilot pressure $P_p$ is higher than the relief pressure $P_{p0}$ and is held at shut-off position while the pilot pressure is held lower than the relief pressure.

In the hydraulic circuit set forth above, the fluid in pump 16 is driven by the engine 200 to discharge pressurized working fluid while the engine is running. The pressurized fluid discharged from the outlet of the fluid pump 16 is fed to the pressure control valve 28 via the supply line 35 including the pressure regulating orifice 202 and the one-way check valve 204. When the pressure control valve 28 is shifted to establish fluid communication between the supply port 54s and the pressure control port 54c from the valve position shown in FIG. 2, the pressurized working fluid passes the pressure control valve 28 and introduced into the working chamber 26d of the hydraulic cylinder 26. On the other hand, when the pressure control valve 28 is shifted to block fluid communication between the supply port 54s and the pressure control chamber PC, the fluid pressure in the supply line 35 increases. When the line pressure in the supply line 35 becomes higher than or equal to the set pressure of the pressure relief valve 206 in the pressure relief line 205, the excessive pressure is fed to the drain line 37 via the pressure relief valve 206 and thus returned to the reservoir tank 16a.

The fluid pressure in the supply line 35 is also fed to the operational one-way check valve 300 via a pilot line 208. As set forth, the operational one-way check valve 300 is placed at open position as long as the pilot pressure introduced through the pilot line 300a is held higher than or equal to the set pressure thereof. Therefore, fluid communication between the pressure control valve 28 and the reservoir tank 16a is maintained. At this position, the working fluid is thus returned to the reservoir tank 16a via the drain line 37 via the operational one-way check valve 300 and the oil cooler 211.

The operational one-way check valve 300, even at the open position, serves as a resistance to the fluid flow. Therefore, the fluid pressure in the drain line 37 upstream of the operational one-way check valve 300 becomes higher, i.e. higher than the offset pressure $P_0$. Then, the pressure relief valve 209 becomes active to open for allowing the excessive pressure of the working fluid to flow through the by-pass line 210.

When the engine stops, the pressure unit 16 ceases operation. By stopping the pressure unit 16, the working fluid pressure in the supply line 35 drops. According to drop of the pressure in the supply line 35, the pilot pressure to be exerted to the operational one-way check valve 300 via the pilot line 300a drops. When the pressure in the pilot line 300a drops below or equal to the set pressure, the operational one-way check valve 300 is switched into operational one-way check position to block fluid communication therethrough. As a results, the fluid pressure in the drain line 37 upstream of the operational one-way check valve 300 becomes equal to the pressure in the working chamber 26d. Therefore, even when the working fluid leaks through a gap between the spool valve 52 and the inner periphery of the valve bore, it is not affect the fluid pressure in the working chamber.

Figure 4:
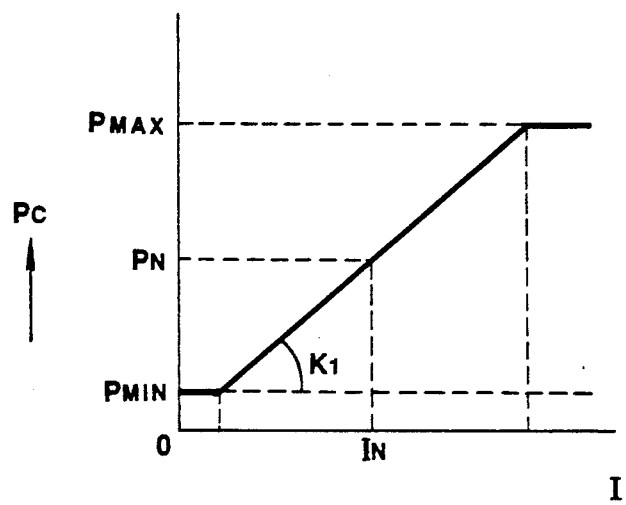
FIG. 4 is a chart showing relationship between an electric current value of a control signal to be supplied for an actuator of the pressure control valve and a working fluid pressure supplied to a working chamber of a hydraulic cylinder.

FIG. 4 shows variation of the working fluid pressure in the working chamber 26d of the hydraulic cylinder 26 according to variation of the current value of the control signal applied to the actuator 29 of the pressure control valve 28. As seen from FIG. 4, the hydraulic pressure in the working chamber 26d varies between a maximum pressure $P_{max}$ which is saturation pressure of the pressure source unit 16 and a minimum pressure $P_{min}$ which is set at a magnitude in view of a noise component to be contained in the control signal. As seen from FIG. 4, the maximum pressure $P_{max}$ corresponds to the maximum current value $I_{max}$ of the control signal and the minimum pressure $P_{min}$ corresponds to the minimum current value $I_{min}$ of the control signal. Furthermore, the hydraulic pressure level as labeled $P_N$ represents neutral pressure at the neutral current $I_N$. As seen, the neutral current $I_N$ is set at an intermediate value between the maximum and minimum current values $I_{max}$ and $I_{min}$.

Operation of the aforementioned pressure control valve 28 in terms of control of suspension characteristics and absorption of road shock will be discussed herebelow.

In general, the pressurized working fluid source unit 16 supplies the predetermined line pressure. For example, the line pressure in the supply line 35 may be set at a pressure of 80 kgf/cm$^2$.

When the vehicle steadily travels on a smooth straight road, the current value of the control signal to be applied to the actuator 29 of the pressure control valve 28 is maintained at the neutral value $I_N$. As long as the neutral value $I_N$ of the control signal is applied to the actuator 29, the proportioning solenoid coil 68 is energized at a magnitude corresponding the neutral value $I_N$ of the control signal to place the poppet valve 48 at the corresponding position. At this position, the flow resistance at the communication path opening 46A, path area of which is restricted by the valve head 48a of the poppet valve 48 becomes the neutral value. At this position of the poppet valve 48, the pilot pressure $P_p$ within the pilot chamber PR is maintained at the neutral pressure $P_N$. At this condition, if the fluid pressures is the control pressure Pc in the pressure control port 54d is held equal to the fluid pressure in the working chamber 26d of the hydraulic cylinder 26, the fluid pressure in the upper and lower feedback chambers FU and FL are held in balance to each other. The valve spool 52 is maintained at the neutral position to shut fluid communication between the supply port 54s, the drain port 54r and the pressure control port 54c. Therefore, the control pressure Pc is maintained at the neutral pressure $P_N$.

At this condition, when relatively high frequency and small magnitude road shock input through the vehicular wheel, is absorbed by fluid communication between the working chamber 26d and the pressure accumulator 34 via the orifice 32. The flow restriction in the orifice 32 serves to absorb the bounding and rebounding energy. Therefore, high frequency and small magnitude road shock can be effectively absorbed so as not to be transmitted to the vehicle body.

When the piston 26c strokes in rebounding direction compressing the working chamber 26d, the fluid pressure in the working chamber increases to increase the control pressure Pc in the pressure control port 54c. Therefore, the control pressure Pc becomes higher than the pilot pressure Pp in the pilot chamber PR. This results in increasing of the fluid pressure in the lower feedback chamber FL at a magnitude higher than that in the upper feedback chamber FU. This causes upward movement of the valve spool 52 to establish fluid communication between the drain port 54r and the pressure control port 54c. Therefore, the pressure in the pressure control port 54c is drained through the drain line 37. This causes pressure drop at the pressure control port 54c so that the control pressure Pc becomes lower than the pilot pressure Pp in the pilot chamber PR. Then, the fluid pressure in the upper feedback chamber FU becomes higher than that in the lower feedback chamber FL. Therefore, the valve spool 52 is shifted downwardly to establish fluid communication between the supply port 54s and the pressure control port 54c. The pressurized working fluid in the supply line 35 is thus supplied to the working chamber 26d via the pressure control port 54c to increase the fluid pressure. By repeating the foregoing cycles, pressure balance is established between the pressure control port 54c and the pilot chamber PR. Therefore, the control pressure Pc as well as the fluid pressure in the working chamber 26d are adjusted to the pilot pressure.

During the pressure adjusting operation set forth above, the fixed throttling orifice Pro serves for restricting fluid flow from the pressure control port 54c to the drain line 37. This flow restriction at the orifice Pro serves as resistance against the rebounding stroke of the piston 26c to damp or absorb energy causing rebounding motion of the vehicle body. Furthermore, as set out, working fluid in the pilot chamber PR is generally introduced through the pilot path PP via the multi-stage orifice Qp and return through the pilot return path PT via the lower section 42U1 of the control chamber 42U and via the multi-stage orifice Pr. As long as the fluid flow in the pilot return path PT is not disturbed and thus steady. The most upstream side orifice Pr' is mainly effective for restricting the fluid flow. Therefore, magnitude of flow restriction is relatively small so as to provide sufficient response characteristics in reduction of the pilot pressure. On the other hand, when the working fluid flowing from the control chamber 42U confluence with the working fluid from the pilot chamber PR, back pressure is produced in the drain port 54r, the fluid flowing through the pilot return path PT is disturbed and thus becomes unstable. This tends to cause serving of the pressurized fluid from the drain port 54r to the pilot chamber PR. In such case, all of the orifices in the multi-stage orifice Pr is effective to create greater flow restriction that than for the steady flow. This avoid influence of the back pressure created in the drain port 54r.

Similarly, in response to the bounding stroke of the piston 26c, the valve spool 52 is shifted up and down to absorb bounding energy and maintains the fluid pressure in the working chamber 26d of the hydraulic cylinder 26 at the neutral pressure.

On the other hand, when the anti-rolling suspension control is taken place in response to the lateral acceleration exerted on the vehicle body, the control signal current value is derived on the basis of the magnitude of the lateral acceleration monitored by the lateral acceleration sensor 23. Generally, in order to suppress rolling motion of the vehicular body, the fluid pressure in the working chamber 26d of the hydraulic cylinder 26 which is provided for the suspension mechanism at the side where the vehicular height is lowered across the neutral position, is increased to suppress lowering motion of the vehicle body. On the other hand, the fluid pressure in the working chamber 26d of the hydraulic cylinder 26 which is provided for the suspension mechanism at the side where the vehicular height is risen across the neutral position, is decreased to suppress rising motion of the vehicle body. Therefore, in order to control the pressures in the working chambers 26d of the both side hydraulic cylinders 26, control signal current values are increased and creased across the neutral value $I_N$.

For example, when rolling motion is caused by left turn of the vehicle, control current for the actuators 29 of the pressure control valves 28 controlling the fluid pressures in the front-right and rear-right hydraulic cyliners 26FR and 26RR are to be increased to be greater than the neutral current $I_N$, and the control current for the actuator of the pressure control valves 28 controlling the fluid pressures in the front-left and rear-left hydraulic cylinders 26FL and 26RL are to be decreased to be smaller than the neutral current $I_N$. By the control current supplied to respective actuators 29, the proportioning solenoid coils 68 are energized at the magnitudes corresponding to the control signal currents to place the poppet valves 48 at respective corresponding positions. By variation of the positions of the poppet valves 48, flow restriction magnitude at respective communication path openings 46A is varied to vary the pilot pressures Pp in the pilot chamber PR. As set forth, since the fluid pressures in the working chambers 26d become equal to the pilot pressures Pp, the suspension characteristics at respective hydraulic cylinders 26 can be adjusted.

Anti-pitching, bouncing suppressive suspension control can be performed substantially in the same manner to that discussed with respect to the anti-rolling control.

Figure 6:
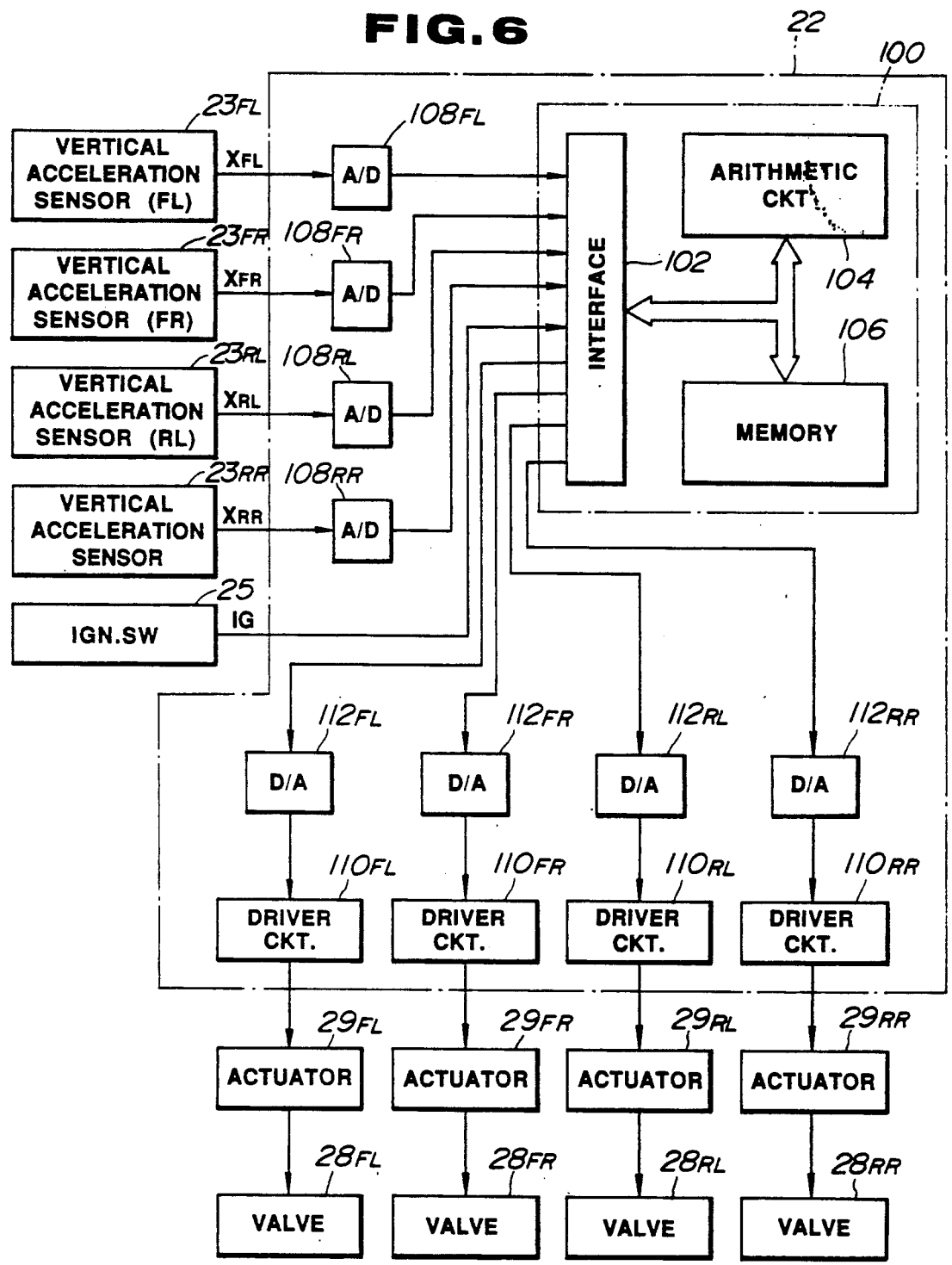
FIG. 6 is a block diagram of the preferred embodiment of a suspension control system according to the present invention.

FIG. 6 is a block diagram of the preferred embodiment of a suspension control system according to the invention. The control unit 22 comprises a microprocessor 100 having an input/output interface 102, an arithmetic circuit 104 and a memory unit 106. Respective of the vertical acceleration sensors 23FL, 23FR, 23RL and 23RR are designed to output vertical acceleration indicative signals $X_{FL}$, $X_{FR}$, $X_{RL}$ and $X_{RR}$ in a form of analog signal. The vertical acceleration indicative signals $X_{FL}$, $X_{FR}$, $X_{RL}$ and $X_{RR}$ are supplied to the microprocessor 100 via analog-to-digital (A/D) converters 108FL, 108FR, 108RL and 108RR. On the other hand, the input/output interface 102 is connected to driver circuit 110FL, 110FR, 110RL and 110RR via digital-to-analog (D/A) converters 112FL, 112FR, 112RL and 112RR. The driver circuits 110FL, 110FR, 110RL and 110RR supplies driver current for respective of the electromagnetic actuators 29FL, 29FR, 29RL and 29RR of the pressure control valves 28FL, 28FR, 28RL and 28RR.

Figure 7:
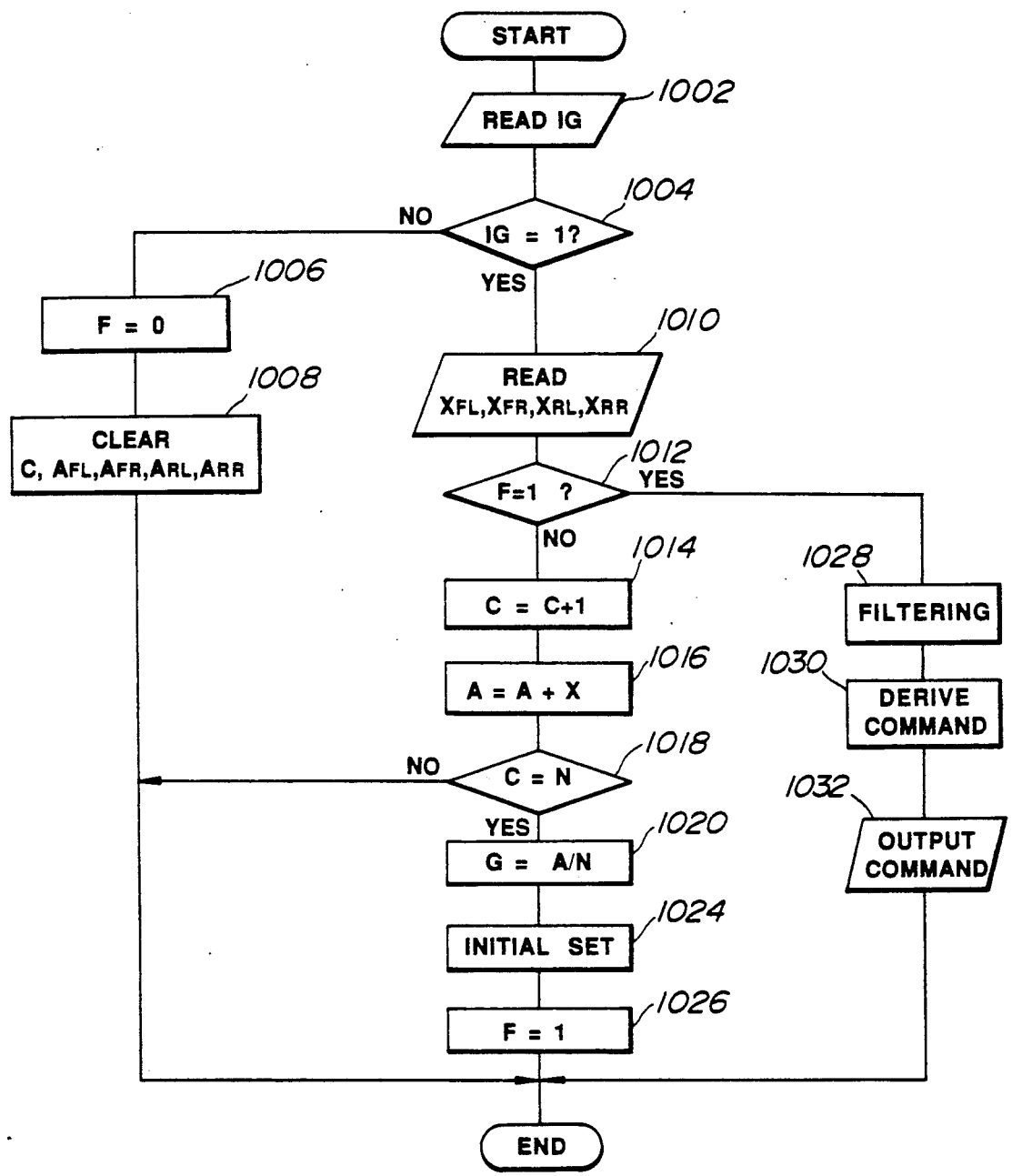
FIG. 7 is a flowchart showing process of suspension control to be performed by the suspension control system of FIG. 6.

FIG. 7 shows a suspension control process to be performed by the suspension control system of FIG. 6. The shown routine is triggered in response to ON set of power supply. Namely, in the automotive vehicle, the ignition switch 25 is switched over OFF position, ACC (accessory) position, ON position and START position, and power supply is started when the ignition switch is placed to ACC position or ON position. Therefore, the timing to trigger the shown routine is switching timing of the ignition switch from the OFF position to ACC position.

Immediately after starting execution, an ignition switch position signal level IG is read out at a step 1002. Then, check is performed whether the ignition switch position signal IG is HIGH level to represent placement of the ignition switch at ACC position or ON position, at a step 1004. If the answer at the step 1004 is negative, a control state indicative flag F is reset at a step 1006 and a counter value C and adder variables $A_{FL}$, $A_{FR}$, $A_{RL}$ and $A_{RR}$ are cleared at a step 1008. Thereafter, process directly goes END.

On the other hand, if the answer at the step 1004 is positive, the vertical acceleration indicative signals $X_{FL}$, $X_{FR}$, $X_{RL}$ and $X_{RR}$ are read out at a step 1010. Then, the control state indicative flag F is checked whether it is set or not, at a step 1012. When the control state indicative flag F is not set as checked at the step 1012, the counter value C is incremented by one (1) at a step 1014 and the vertical acceleration indicative signals $X_{FL}$, $X_{FR}$, $X_{RL}$ and $X_{RR}$ are added to the adder variables $A_{FL}$, $A_{FR}$, $A_{RL}$ and $A_{RR}$, at a step 1016. Thereafter, the counter value C is checked whether it reaches a predetermined value N at a step 1018. If not, process directly goes END. On the other hand, when the answer at the step 1018 is positive, an average values $G_{FL}$, $G_{FR}$, $G_{RL}$ and $G_{RR}$ of respective adder variables $A_{FL}$, $A_{FR}$, $A_{RL}$ and $A_{RR}$ are derived by dividing by N, at a step 1020. Thereafter, initialization of data for filtering process is performed at a step 1024.

Here, as set forth, filtering of the vertical acceleration indicative signal valves $X_{FL}$, $X_{FR}$, $X_{RL}$ and $X_{RR}$ is performed by utilizing low-pass filter serving as an integrator and high-pass filter serving for removing direct current component from the vertical acceleration indicative signals. Here, the cut-off frequency of the high-pass filter is assumed as $f_{CH}$ and the cut-off frequency of the low-pass filter is $f_{CL}$, and Laplacean is assumed as S. Then, the transfer function G(S) between the vertical acceleration indicative value X and the vertical stroke speed Y can be expressed by:

$$G(S) = \frac{T_1 S}{1 + T_1 S} \cdot \frac{1}{1 + T_2 S}$$

where $T_1 = 1/2 \pi f_{CH}$, $T_2 = 1/2 \pi f_{CL}$

Expressing the Laplacean S by:

$$S = \frac{2}{T_3} \cdot \frac{1 - Z^{-1}}{1 + Z^{-1}}$$

the foregoing equation can be converted into:

$$G(Z) = \frac{D(1 - Z^{-2})}{AZ^{-2} + BZ^{-1} + C}$$

where Ts is sampling period;

$$A = (1 - 2 T_1/T_3)(1 - 2 T_2/T_3)$$
$$B = 2(1 - 4 T_1 T_2/T_3^2)$$
$$C = (1 + 2 T_1/T_3)(1 + 2 T_2/T_3)$$
$$D = 2 T_1/T_3$$

From the above, the following equation can be derived.

$$Y = \frac{D}{C} X - \frac{D}{C} XZ^{-2} - \frac{A}{C} YZ^{-2} - \frac{B}{C} YZ^{-1}$$

where
  $XZ^{-2}$ is vertical acceleration sampled at 2 ahead sampling cycle;
  $YZ^{-2}$ is vertical stroke speed derived at 2 ahead sampling cycle;
where
  $XZ^{-1}$ is vertical acceleration sampled at 1 ahead sampling cycle;
  $YZ^{-1}$ is vertical stroke speed derived at 1 ahead sampling cycle.

Upon starting up of the control system, the $XZ^{-2}$, $YZ^{-2}$, $XZ^{-1}$ and $YZ^{-1}$ are not present. Therefore, these values have to be appropriately set. Here, if all data are set at zero (0), the offset contained in the vertical acceleration indicative signal due to temperature dependent drift and so forth may influence suspension control. Therefore, in the preferred embodiment, these values are initially set at the following values:

$$YZ^{-2} = YZ^{-1} = 0$$
$$XZ^{-2} = XZ^{-1} = G$$

In the foregoing equation, G can be average of the $G_{FL}$, $G_{FR}$, $G_{RL}$ and $G_{RR}$.

After filtering process, the control state indicative flag F is set at a step 1026.

On the other hand, when the answer at the step 1012 is positive, the filtering process is performed at a step 1028. At this time, since the step 1028 is performed after one cycle of preceding execution cycle, at least one data can be obtained from the former cycle. Even in such case, the offset can be successfully canceled. After filtering process at the step 1028, the suspension control command value is derived at a step 1030 and output at a step 1032.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For instance, the active suspension system can be constructed in various fashion and control of the active suspension can be done in various manner. For example, reference is made to the following co-pending application, publication and patents.

U.S. patent application Ser. No. 052,934, filed on May 22, 1989, which has now been issued as U.S. Pat. No. 4,903,983, on Feb. 27, 1990:

U.S. patent application Ser. No. 059,888, filed on June 9, 1987, corresponding European Patent Application has been published as First Publication No. 02 49 209:

U.S. patent application Ser. No. 060,856, filed on June 12, 1987, corresponding European Patent Application has been published as First Publication No. 02 49 227:

U.S. patent application Ser. No. 060,909, filed on June 12, 1987:

U.S. patent application Ser. No. 060,911, filed on June 12, 1987, which has now been issued as U.S. Pat. No. 4,801,115, on Jan. 31, 1989:

U.S. patent application Ser. No. 176,246, filed on Mar. 31, 1988, the corresponding European Patent Application has been published as First Publication No. 02 85 153:

U.S. patent application Ser. No. 178,066, filed on Apr. 5, 1988, which has now been issued as U.S. Pat. No. 4,848,790, on July 18, 1989, and the corresponding European Patent Application has been published as First Publication No. 02 86 072:

U.S. patent application Ser. No. 167,835, filed on Mar. 4, 1988, which has now been issued as U.S. Pat. No. 4,865,348, on Sept. 12, 1989:

U.S. patent application Ser. No. 244,008, filed on Sept. 14, 1988:

U.S. patent application Ser. No. 255,560, filed on Oct. 11, 1988:

U.S. patent application Ser. No. 266,763, filed on Nov. 3, 1988, corresponding European Patent Application has been published under First Publication No. 03 18 721:

U.S. patent application Ser. No. 261,870, filed on Oct. 25, 1988:

U.S. patent application Ser. No. 263,764, filed on Oct. 28, 1988, corresponding European Patent Application has been published under First Publication No. 03 14 164:

U.S. patent application Ser. No. 277,376, filed on Nov. 29, 1988, corresponding European Patent Application has been published under First Publication No. 03 18 932:

U.S. patent application Ser. No. 303,338, filed on Jan. 26, 1989, corresponding German Patent Application has been published under First Publication No. 39 02 312:

U.S. patent application Ser. No. 302,252, filed on Jan. 27, 1989:

U.S. patent application Ser. No. 310,130, filed on Mar. 22, 1989, corresponding German Patent Application has been published under First Publication No. 39 04 922:

U.S. patent application Ser. No. 327,460, filed on Mar. 22, 1989, corresponding German Patent Application has been published under First Publication No. 39 10 030:

U.S. patent application Ser. No. 303,339, filed on Jan. 26, 1989:

U.S. patent application Ser. No. 331,602, filed on Mar. 31, 1989:

U.S. patent application Ser. No. 331,653, filed Mar. 31, 1989, corresponding German Patent Application has been published under First Publication No. 39 10 445:

U.S. patent application Ser. No. 364,477, filed on June 12, 1989, corresponding European Patent Application has been published under First Publication No. 03 45 816:

U.S. patent application Ser. No. 365,468, filed on June 12, 1989, corresponding European Patent Application has been published under First Publication No. 03 45 817:

U.S. patent application Ser. No. 422,813, filed on Oct. 18, 1989:

U.S. patent application Ser. No. 454,785, filed on Dec. 26, 1989:

The disclosures of the hereabove listed prior applications, publications and patents are herein incorporated by reference. Furthermore, any two or more prior proposed inventions may be combined in practical implementation of an active suspension system. Therefore, any combination of the above mentioned prior proposed inventions are to be deemed as disclosed due to incorporation by reference as a part of the present invention.

What is claimed is:

1. An actively controlled suspension system comprising:
   a hydraulic cylinder disposed between a vehicle body and a suspension member rotatably supporting a vehicular wheel, said hydraulic cylinder defining therein a working chamber;
   pressure source means including pump means associated with an automotive internal combustion engine to be driven by an output of said engine;
   pressure control valve means having a first port connected to said working chamber, a second port connected to said pressure source means via a supply line and a third port connected to said pressure source means via a drain line, said pressure control valve means being variable of valve position for selectively establishing and blocking fluid communication between said first port and said second port and between said first port and said third port for adjusting fluid pressure in said working chamber for controlling suspension characteristics;
a vertical acceleration sensor for monitoring vertical acceleration exerted on the vehicle body to produce a vertical acceleration indicative signal;
first means for arithmetically deriving a vertical stroke speed of said vehicle body on the basis of said vertical acceleration indicative signal; and
second means for detecting initiation of arithmetic operation of said first means for setting data for use in derivation of said vertical stroke speed to a value for cancelling an offset contained in said vertical acceleration indicative signal.

2. An actively controlled suspension system comprising:
a hydraulic cylinder disposed between a vehicle body and a suspension member rotatably supporting a vehicular wheel, said hydraulic cylinder defining therein a working chamber;
pressure source means including pump means associated with an automotive internal combustion engine to be driven by an output of said engine;
pressure control valve means having a first port connected to said working chamber, a second port connected to said pressure source means via a supply line and a third port connected to said pressure source means via a drain line, said pressure control valve means being variable of valve position for selectively establishing and blocking fluid communication between said first port and said second port and between said first port and said third port for adjusting fluid pressure in said working chamber for controlling suspension characteristics;
a vertical acceleration sensor for monitoring vertical acceleration exerted on the vehicle body to produce a vertical acceleration indicative signal;
first means for arithmetically deriving a vertical stroke speed of said vehicle body on the basis of an instantaneous value of said vertical acceleration indicative signal, and a sampled value of said vertical acceleration indicative signal preceding said instantaneous value; and
second means for detecting initiation of arithmetic operation of said first means for setting said preceding sampled value for use in derivation of said vertical stroke speed to a value for cancelling an offset included in said vertical acceleration indicative signal.

3. An actively controlled suspension system comprising:
a suspension unit disposed between a vehicle body and a suspension member rotatably supporting a vehicle wheel, said suspension unit including fluid pressure means of adjustable pressure;
a pressure source for supplying pressurized fluid to the fluid pressure means for active suspension control;
a sensor for sensing acceleration for affecting vehicle attitude change acting on the vehicle body to provide a signal indicative thereof;
first means responsive to the signal from said sensor to sample a preselected number of acceleration values for determining a speed of the vehicle attitude change and providing a signal indicative thereof;
pressure control means responsive to the signal from said first means to adjust fluid pressure supplied from said pressure source to the fluid pressure means for controlling the vehicle attitude change; and
second means responsive to initiation of operation of said first means to initialize acceleration data for compensating error included in the signal from said sensor relating to the magnitude of the sensed acceleration, so that said operation results in a value of zero.

4. A system as set forth in claim 3, wherein said acceleration sensed by said sensor is vertical acceleration acting on the vehicle body.

5. A system as set forth in claim 3, wherein said controlling of the vehicle attitude change is cyclically executed.

6. A system as set forth in claim 4, wherein said first means provides the speed of vehicle attitude change according to a preselected mathematical operation wherein a first parameter relating to $XZ^{-2}$ (indicative of an acceleration value two sampling cycles before an instantaneous acceleration value), a second parameter relating to $YZ^{-2}$ (indicative of a value of the speed of the vehicle attitude change provided based on the acceleration value two sampling cycles before said instantaneous acceleration value), and a third parameter relating to $YZ^{-1}$ (indicative of a value of the speed of the vehicle attitude change provided based on an acceleration value one sampling cycle before said instantaneous acceleration value), are substracted from a fourth parameter relating to X (indicative of the instantaneous acceleration value),
said second means initializing the $YZ^{-2}$ and $YZ^{-1}$ to zero and the $XZ^{-2}$ to an average value obtained by averaging the preselected number of acceleration values sampled by said first means.

* * * * *